United States Patent
Kaye

(10) Patent No.: US 7,546,864 B2
(45) Date of Patent: Jun. 16, 2009

(54) STIFFENING MEANS FOR STRUCTURAL COMPONENTS, METHOD OF MANUFACTURING AND APPARATUS THEREFOR

(75) Inventor: Allan Kaye, Bristol (GB)

(73) Assignee: Airbus UK Limited, Bristol (GB)

( * ) Notice: Subject to any disclaimer, the term of this patent is extended or adjusted under 35 U.S.C. 154(b) by 1183 days.

(21) Appl. No.: 10/362,748

(22) PCT Filed: Aug. 31, 2001

(86) PCT No.: PCT/GB01/03914

§ 371 (c)(1),
(2), (4) Date: Feb. 27, 2003

(87) PCT Pub. No.: WO02/20248

PCT Pub. Date: Mar. 14, 2002

(65) Prior Publication Data

US 2003/0180501 A1    Sep. 25, 2003

(30) Foreign Application Priority Data

Sep. 7, 2000    (GB) ................................. 0021955.0

(51) Int. Cl.
*B32B 3/06* (2006.01)
(52) U.S. Cl. ...................................... 156/467; 156/461
(58) Field of Classification Search ................. 156/198, 156/199, 200, 201, 202, 204, 226, 227, 304.1, 156/461, 463, 464, 465, 470, 476; 493/380; 428/119, 120
See application file for complete search history.

(56) References Cited

U.S. PATENT DOCUMENTS

| 1,313,234 | A | * | 8/1919 | Jones ........................... 53/450 |
| 2,708,648 | A | * | 5/1955 | Ulmschneider ............. 156/164 |
| 2,822,575 | A | * | 2/1958 | Imbert et al. ................ 156/192 |
| 2,914,108 | A | * | 11/1959 | Coakley ..................... 118/411 |
| 4,151,031 | A | | 4/1979 | Goad et al. |
| 4,299,871 | A | * | 11/1981 | Forsch ........................ 428/104 |
| 4,749,155 | A | | 6/1988 | Hammer et al. |
| 4,966,802 | A | | 10/1990 | Hertzberg |
| 5,015,168 | A | | 5/1991 | Boime et al. |
| 5,670,220 | A | * | 9/1997 | Skoien ........................ 428/12 |
| 5,735,486 | A | | 4/1998 | Piening et al. |
| 6,620,484 | B1 | * | 9/2003 | Bolukbasi et al. ........... 244/123 |

FOREIGN PATENT DOCUMENTS

| DE | 198 32 441 | 1/2000 |
| EP | 0 217 315 | 4/1987 |
| FR | 2 440 831 | 6/1980 |
| GB | 2 072 579 | 10/1981 |
| WO | WO 99/59802 | 11/1999 |

\* cited by examiner

*Primary Examiner*—Richard Crispino
*Assistant Examiner*—Barbara J. Musser
(74) *Attorney, Agent, or Firm*—Nixon & Vanderhye P.C.

(57) ABSTRACT

Structural stiffening 14, a stiffened structure 10 and apparatus 37 and method for forming the structural stiffening 14. The structural stiffening 14 is formed using first and second forming means adapted to respectively receive first and second sheets of material 39 and form an upstanding portion 30 in each of said sheets, feed means adapted to feed a filler material 24 between said upstanding portions 30, and fixing means 50 adapted to fix said upstanding portions 30 to said filler material 24. The structural stiffening may be attached to a structure to be stiffened 12 to form a stiffened structure 10.

3 Claims, 4 Drawing Sheets

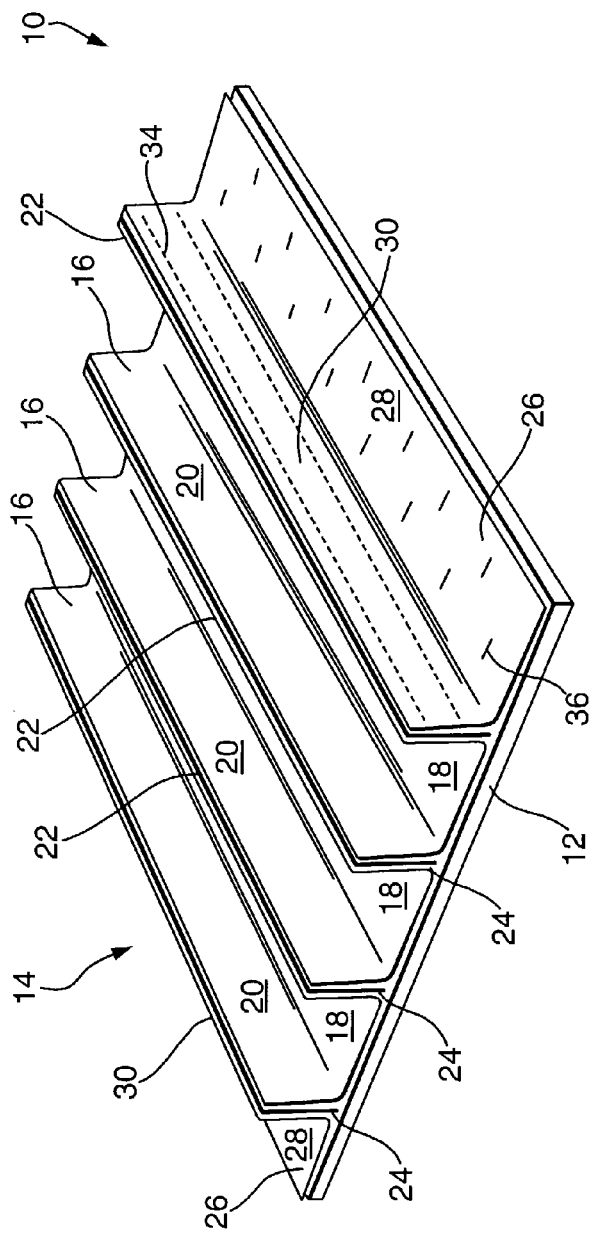
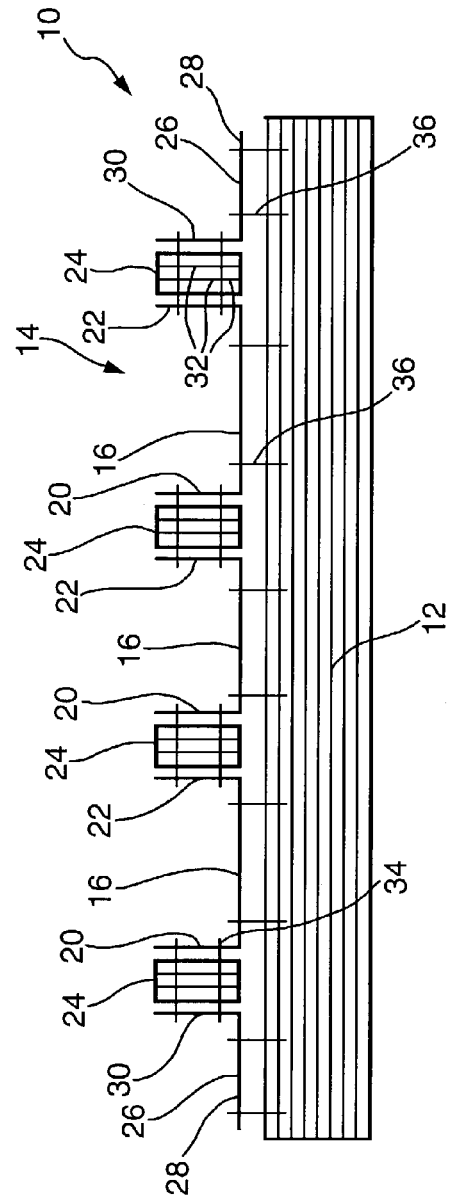
Fig.1.
Fig.2.

STIFFENING MEANS FOR STRUCTURAL COMPONENTS, METHOD OF MANUFACTURING AND APPARATUS THEREFOR

This application is the US national phase of international application PCT/GB01/03914, filed in English on 31 Aug. 2001 which designated the US. PCT/GB01/03914 claims priority to GB Application No. 0021955.0 filed 7 Sep. 2000. The entire contents of these applications are incorporated herein by reference.

The present invention relates to stiffening means for structural components, and in particular to stiffening means in the form of stringers for use in connection with the stiffening of airframe structures such as stiffened skins.

Conventional airframe manufacturing techniques form skin stiffeners, known as stringers, with an inverted "T" cross section by hand. The stringers are then attached to the airframe structural component by the crosspieces of the inverted "T", using a co-curing process in an autoclave, with the upright elements of the "T" forming upstanding portions to provide the main structural reinforcement.

This technique is very time consuming and labour intensive. In addition, the surface between the upstanding portions of the stringers is often comprised of two levels, that of the stringer crosspiece interspersed with that of the aircraft skin surface. This difference in levels often makes it very difficult to securely attach further structures such as stiffening ribs, which are usually attached across the stringers, and thus can limit possible airframe designs.

DE 198 32 441 C1 discloses a method of stringer-stiffened shell of composite fibre construction. Using this method a moulded fibre reinforced plastic construction comprising a shell-shaped skin and integral stringers for stiffening may be formed. However, this method does not allow the stiffening to be constructed independently of the skin and the difficulties of attaching further structures are still an issue.

According to a first aspect of the present invention there is provided an apparatus for forming structural stiffening, aligning means to align first and second sheets of material, first and second forming means adapted to receive respective said first and second sheets and form an upstanding portion each of said sheets by progressively deflecting and folding opposed edges of said sheets, and bonding means to bond together said progressively folded opposed edges to form an integral component.

The forming means may comprise a guide adapted progressively to deflect and fold an edge of said material as said sheets are moved thereacross.

The present invention thus provides apparatus which is adapted to combine material in sheet form to create a stiffener.

The apparatus preferably includes feed means adapted to feed filler material between said upstanding portions. The bonding means may be configured so that bonding occurs concurrently with the progressively deflecting and folding of said opposed edges. It is preferred that the bonding means includes means adapted to fix said upstanding portions together. The fixing means may insert at least one fixing element through the upstanding portions. The fixing elements may be in the form of stitches.

In a preferred embodiment the apparatus includes at least one third forming means adapted to receive at least one third sheet of material, said at least one third forming means being interposed between said first and second forming means and adapted to form upstanding portions in opposed edges of said at least one third sheet of material by progressively deflecting and folding opposing edges of the at least one third sheet of material and align said upstanding portions of said third sheet with the upstanding portions of said first and second sheets.

In such an embodiment the third forming means may comprise a guide adapted progressively to deflect and fold opposing edges of the third sheet of material as it is moved thereacross. The feed means may be adapted to feed a filler material between adjacent upstanding said portions.

The apparatus may include storage means for said sheets and said filler material. The storage means preferably comprise drums or spools around which the sheets and filler material are wound.

The apparatus may be movable, for example on a carriage, so as to enable a stringer formed thereby to be attached to a structural component, preferably progressively.

According to a second aspect of the present invention there is provided a method of forming structural stiffening by aligning first and second sheets of material and progressively forming upstanding portions of said sheets by progressively folding opposed edges of said sheets and then bonding together said progressively folded opposed edges to form an integral component.

This method of manufacture allows faster production than conventional manufacturing techniques.

The method may include the steps of positioning and then attaching said structural stiffening to a structure to be stiffened. The method may further include the steps of positioning a formed part of said structural stiffening on said structure to be stiffened during formation of said structural stiffening and subsequently carrying out the step of bonding together said progressively folded opposed edges to form an integral component, or may include the step of positioning a fully formed said structural stiffening on said structure to be stiffened. The step of bonding together said progressively folded opposed edges to form an integral component may be carried out before or after the step of positioning said stiffening on said structure.

The method may include the steps of interposing and aligning at least one third elongate sheet of material between the said opposed edges of said first and second sheets of material and progressively forming two upstanding portions in said at least one third sheet by progressively folding opposed edges of said at least one third sheet concurrent with the forming of said upstanding portions of the said first and second sheets.

It is preferred that the method of manufacture includes the steps of interposing a filler material between each pair of said adjacent upstanding portions. It is further preferred that the method of manufacture includes the steps of fixing said adjacent upstanding portions together.

According to a third aspect of the present invention there is provided structural stiffening for attachment to a structure to be stiffened wherein at least one intermediate element of said structural stiffening is formed from a sheet of material shaped to form a U-section, having a base portion for attachment to a structure and two upstanding portions, the at least one intermediate element being interposed between 'L' shaped elements formed from sheets of material having a base portion and an upstanding portion. It is preferred that filler material is interposed between each pair of said adjacent upstanding portions. Said upstanding portions may be fixed together. One or more fixing elements that pass through both the upstanding portions and, if present, the filler material. The base portion of said structural stiffening provides a level, even surface that is suitable for the attachment of further structure such as stiffeners, for example ribs, and thus increases the possibilities for airframe design.

According to a fourth aspect of the present invention there is provided a stiffened structure having a structure to be stiffened attached to structural stiffening according to the third aspect of the present invention. The stiffened structure may have further structure attached to the base portion of the stiffeners. The said further structure may be attached at an angle of substantially 90° to the base portion of the said intermediate element.

An embodiment of the present invention will now be described with reference to the accompanying drawings in which:

FIG. 1 shows a perspective view of a portion of a stiffened structure having a structural stiffening provided thereupon;

FIG. 2 shows a cross-sectional view of the portion of a stiffened structure of FIG. 1;

Figure 3:
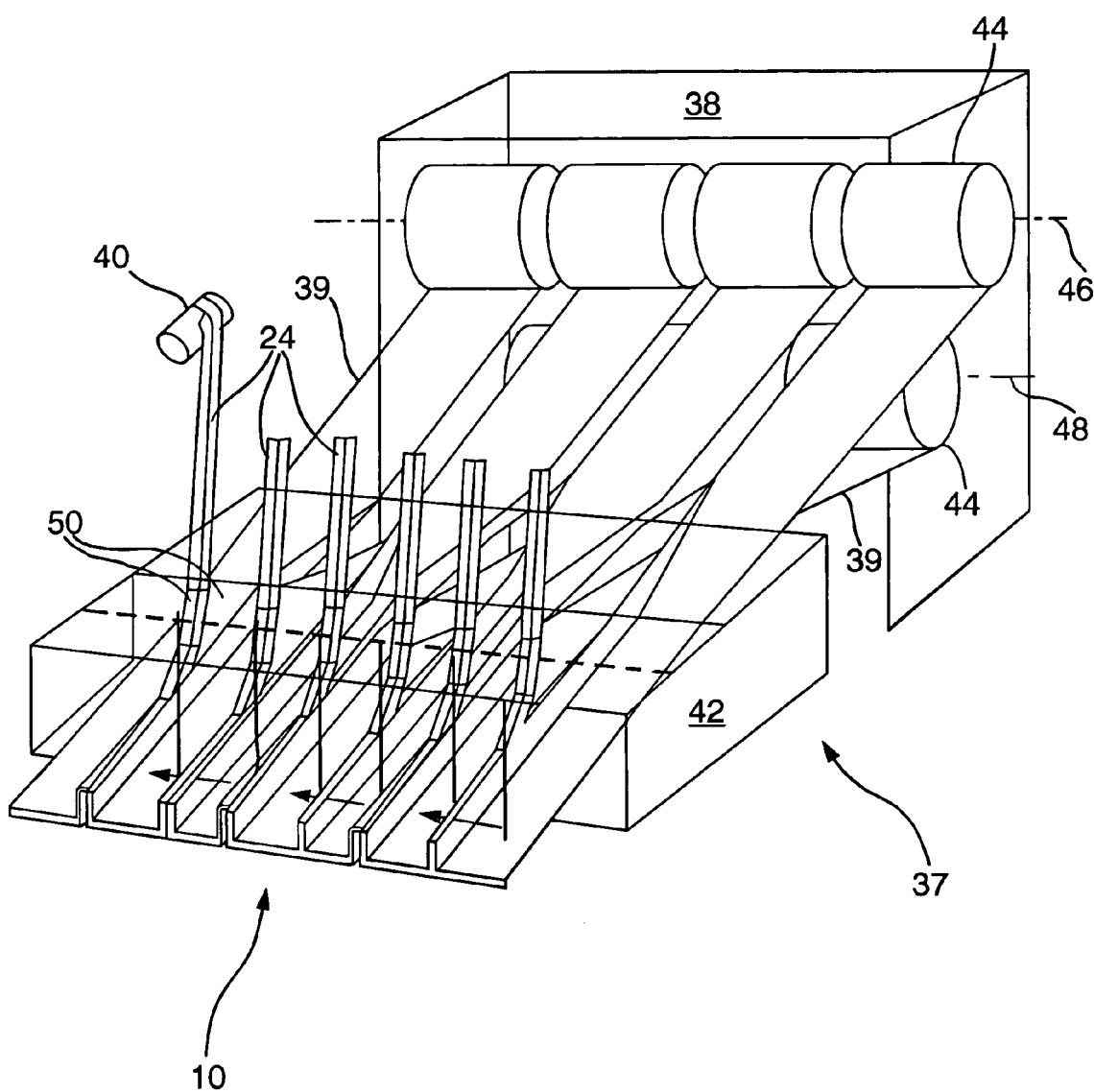
FIG. 3 shows a diagrammatic perspective view of an apparatus according to the present invention.

Referring firstly to FIGS. 1 and 2 there is shown a portion of a stiffened structure, generally designated 10, which comprises a structure to be stiffened 12 and stiffening assembly 14. The stiffening assembly 14 comprises three "U" shaped channels 16 each having a base 18 and upstanding portions 20, 22, and a filler material 24 interposed between adjacent channels 16. At each side of the stiffening assembly 14 there is provided an "L" shaped member 26 of the same length as the channels 16 and having a base 28 and an upstanding portion 30. The upstanding portion 30 of each member 26 is positioned adjacent to the outermost portion 20,22 of the respective outermost channels 16 and, as before a filler material 24 is provided therebetween.

The channels 16, filler material 24 and members 26 are formed from non-crimp fabric (NCF). In the case of the channels 16 and members 26, these are formed from sheets of NCF folded to the required shape. The filler material 24 comprises a plurality of overlapping plies 32 as can be seen from the cross-sectional view in FIG. 2. The channels 16, filler material 24 and members 26 are connected to one another by stitching 34 passing through adjacent upstanding portions 20, 22, 30 and filler material 24. The stiffening assembly 14 is further located on the structure to be stiffened 12 by stitches 36 passing through the bases 18,28 of the channels 16 and members 26.

FIG. 3 shows an apparatus 37 adapted to produce a stiffening assembly 14 of the type described above with reference to FIGS. 1 and 2. The apparatus 37 comprises a first dispenser 38 adapted to dispense lengths of NCF 39 for use in forming the "L" shaped members 26 and the channels 16, a plurality of second dispensers 40 adapted to dispense the filler material 24, and a forming device 42. For the sake of clarity only one of the second dispensers 40 is shown.

The first dispenser 38 includes a plurality of reels 44 arranged in two tiers 46, 48. The reels 44 are wound with lengths of NCF 39. In the embodiment shown, the upper tier 46 is provided with four reels 44 and the lower tier 48 with three reels 44.

The forming device 42 is adapted to receive the lengths of NCF 39 from the reels 44 and filler material 24 from the second dispenser 40. Forming plates are provided within the device 42 which form the NCF 39 into the required "L" and "U" shapes. The plates also serve to align the formed NCF 39 into a common plane while leaving sufficient space for the filler material 24 between the portions 20, 22, 30. Guides 50 are provided to guide the filler material 24 from the second dispenser 40 to the spaces between the portions 20, 22, 30. Finally, the forming device 42 is provided with stitching devices arranged to stitch across the filler material 24 and portions 20, 22, 30.

Figure 4A:
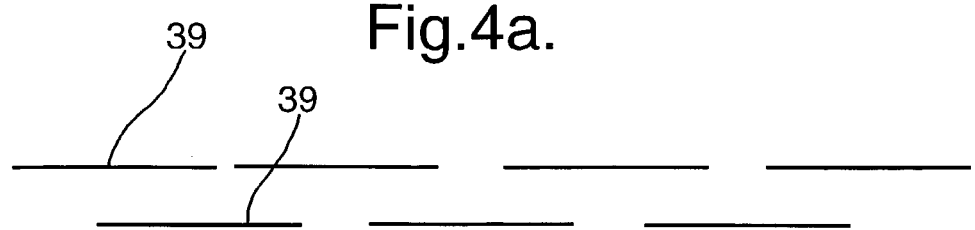
FIGS. 4a to 4d show diagrammatic representations of four stages in the formation of stringers by apparatus according to the present invention.
Figure 4B:
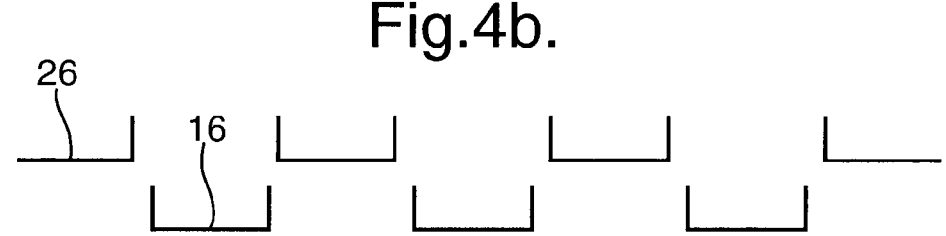
Figure 4C:
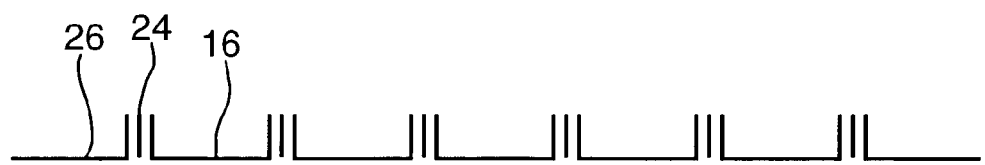
Figure 4D:
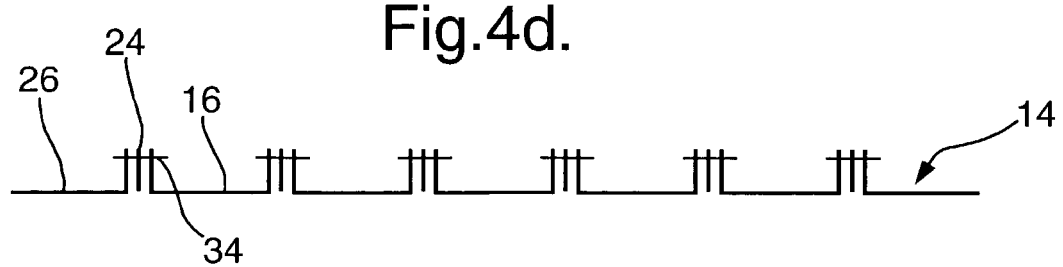

FIGS. 4a to 4d show how the NCF 39 from the reels 44 is formed, combined with the filler material 24 and stitched. FIG. 4a shows the overlapping arrangement of the NCF 39 as it passes from the reels 44 to the forming device 42. FIG. 4b shows the NCF 39 formed into the "L" and "U" shapes by the forming plates. FIG. 4c shows the NCF 39 aligned in a common plane with the filler 24 interspersed between the portions 20, 22, 30. Finally FIG. 4d shows the NCF 39 and filler 24 stitched together, forming the stiffening assembly 14.

Figure 5:
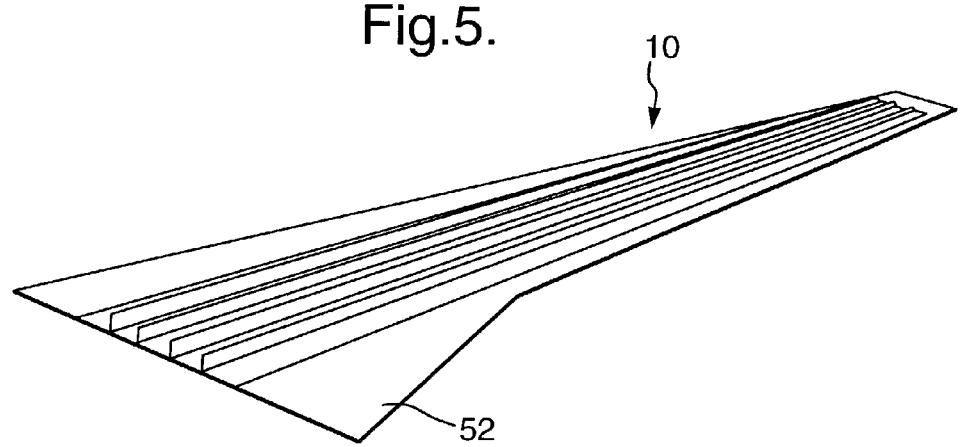
FIG. 5 shows a perspective view of a wingskin having stringers thereupon.
Figure 6:
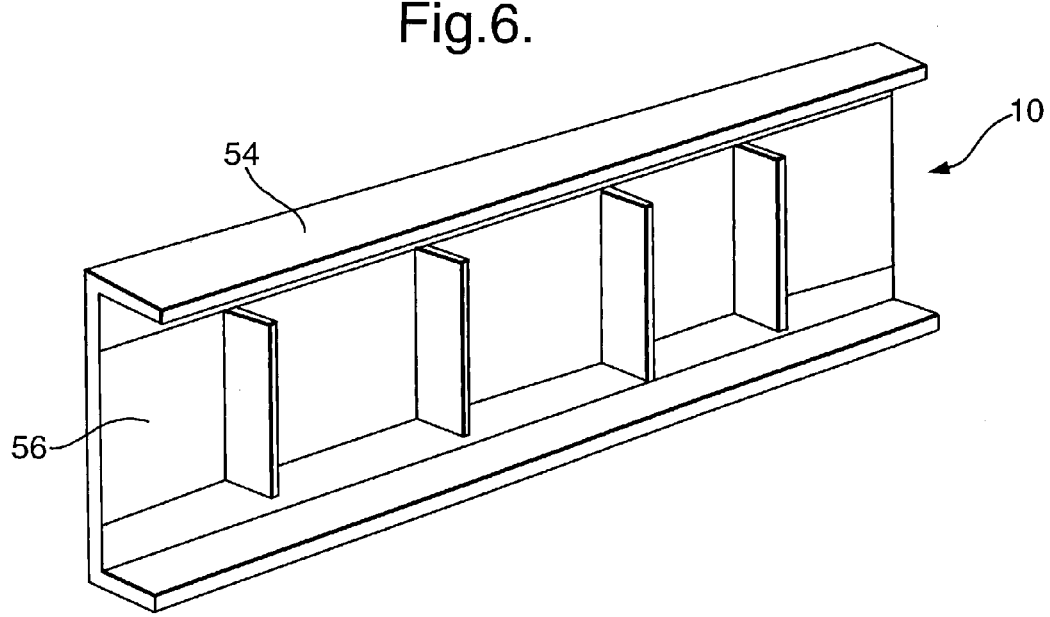
FIG. 6 shows a perspective view of a spar having stringers thereupon.

FIGS. 5 and 6 show two examples of structural components having a stiffening assembly 14 thereupon. FIG. 5 shows a wingskin 52 having the stiffening assembly 14 running the length thereof. The stiffening assembly 14 may be formed separately from the wingskin 52 and then positioned thereupon. Alternatively the stiffening assembly 14 may be formed in situ. For example, the forming device 42 may be positioned above the wingskin 52 and then moved relative thereto as the stiffening assembly 14 are formed thereby. FIG. 6 shows a "U" shaped rib or spar 54 having a section 56 of a stiffening assembly 14 thereupon.

The invention claimed is:

1. An apparatus for forming structural stiffening, said apparatus comprising:
   aligning means to align first and second sheets of material, said sheets of material located adjacent and generally co-planar with one another:
   first and second forming means adapted to receive respective said first and second sheets and form an upstanding portion in each of said sheets, said upstanding portions of each of said sheets extending in a given direction and adjacent one another, said first and second forming means for progressively deflecting and folding opposed edges of said sheets,
   bonding means for bonding together said adjacent upstanding portions of said progressively folded opposed edges to form an integral component; and
   feed means adapted to feed filler material between said upstanding portions.

2. An apparatus as claimed in claim 1 wherein said feed means is adapted to feed filler material between adjacent said upstanding portions.

3. An apparatus for forming structural stiffening, said apparatus comprising:
   aligning means to align first and second sheets of material, said sheets of material located adjacent and generally co-planar with one another;
   first and second forming means adapted to receive respective said first and second sheets and form an upstanding portion in each of said sheets, said upstanding portions of each of said sheets extending in a given direction and adjacent one another, said first and second forming means for progressively deflecting and folding opposed edges of said sheets, and
   bonding means for bonding together said adjacent upstanding portions of said progressively folded opposed edges to form an integral component, wherein the bonding means includes fixing means adapted to fix said upstanding portions together by inserting at least one fixing element through the upstanding portions.

* * * * *